(No Model.)
M. WEISEL.
CAR FENDER.
No. 571,938. Patented Nov. 24, 1896.
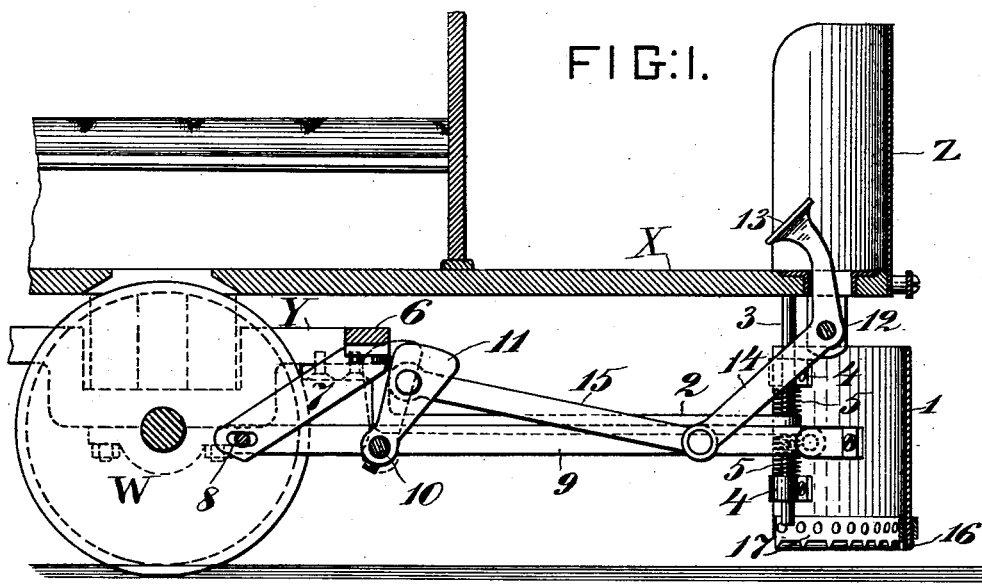
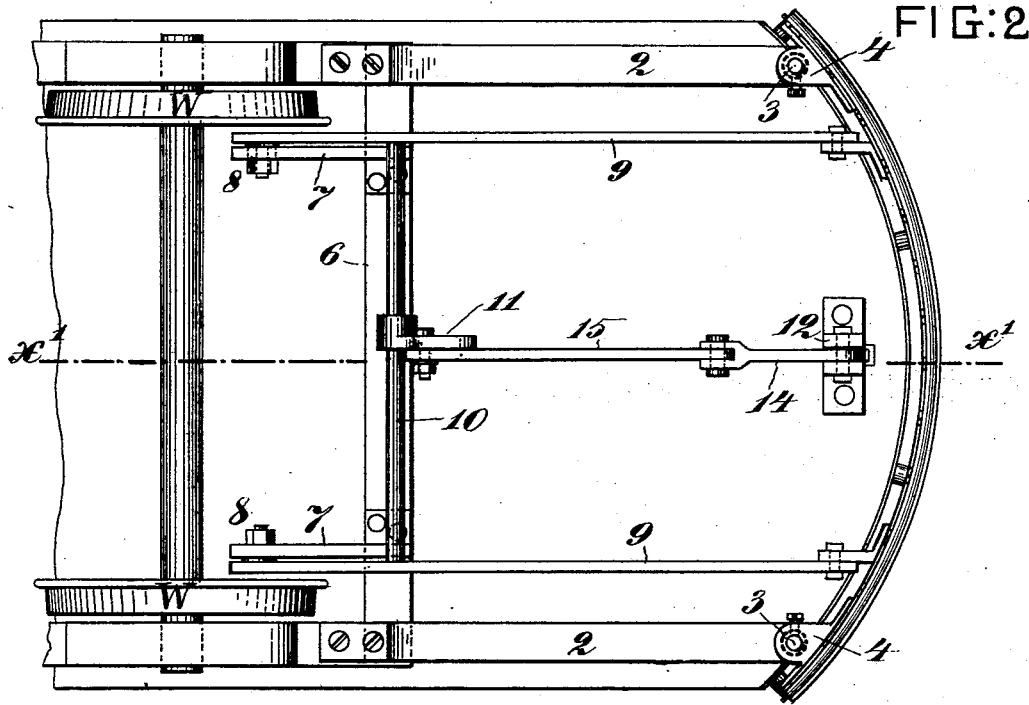
WITNESSES:
INVENTOR:
Morris Weisel
By Henry Connett
Attorney.

UNITED STATES PATENT OFFICE.

MORRIS WEISEL, OF NEW YORK, N. Y.

CAR-FENDER.

SPECIFICATION forming part of Letters Patent No. 571,938, dated November 24, 1896.

Application filed July 1, 1896. Serial No. 597,668. (No model.)

*To all whom it may concern:*

Be it known that I, MORRIS WEISEL, a citizen of the United States, residing in the city, county, and State of New York, have invented certain new and useful Improvements in Car-Fenders, of which the following is a specification.

My invention relates to the class of fenders such as are employed on trolley-cars, for example, and which are adapted to be depressed by the motorman.

The object is to provide the car with a simple and inexpensive fender at each end which will not extend notably beyond the end of the car and which will not permit a person on the track to get under the car. The function of my device is purely that of a fender, and it is not designed to pick up a person who has fallen on the track.

The accompanying drawings illustrate an embodiment of the invention as applied to a car.

Figure 1 is a longitudinal vertical section of one end of the car and of the fender thereon, the plane of the section being indicated by line $x'$ in Fig. 2. Fig. 2 is an under side plan view of the car and fender.

X represents the platform of a car; Y, the truck-frame thereof; Z, the dashboard, and W the wheels.

1 is the fender proper, which consists of a plate bent, by preference, to conform to the curve of the dashboard and suspended substantially in a vertical plane under the front end of the platform. This fender is carried on the front ends of two arms 2, which are rigidly secured to the truck-frame. In the front end of each arm 2 is fixed an upright guide-bar 3, the upper and lower ends of such bar extending, respectively, through eye brackets or keepers 4, fixed to the fender. Between each keeper 4 and the arm 2 and embracing the bar 3 is a spring 5, which serves as a cushion. The upper ends of the bars 3 play freely through guideways in the platform of the car.

On a transverse beam or bar 6 of the truck-frame are fixed two brackets 7, and to each of said brackets is coupled by a slotted connection 8 the rear end of a depressing-arm 9, the front end of which is coupled to the fender 1.

In order to enable the motorman to depress the fender in an emergency, a cam-and-lever mechanism is provided adapted to be actuated by the foot of a man standing on the platform.

On a rock-shaft 10, which has bearings at its ends in the arms 9, is secured a cam 11, which, when rocked backward, takes under the transverse bar 6 on the truck-frame and depresses the arms 9 and the fender. This rocking is effected by means of an elbow-lever fulcrumed at 12 on the platform. One arm, 13, of this lever projects up through and plays in a slot in the platform and is adapted to be pressed forward by the foot, and the other arm, 14, is coupled by a link 15 to the cam 11. When the lever-arm 13 is pressed forward by the foot and the cam thus rocked and forced backward under the bar 6, the depressed fender may be held down forcibly with a very light pressure of the foot, as the shaft 10 is directly under the bar 6, and the cam acts as a stud.

The lower edge of the fender will have, by preference, a cushion 16, of rubber cloth or other like yielding material, and back of this cushion, at the rear face of fender, will be applied, by preference, a toothed or serrated strip 17.

The operation of the device is as follows: When the motorman sees a person on the track in front of the car and finds that he cannot stop the car in time to avoid a collision, he presses forward the lever-arm 13 with his foot, thus depressing the fender until the cushion on the lower edge thereof is on the ground, and he holds it there until the car is stopped. The fender will effectually prevent the body of the person from getting under the car, where it would inevitably be mangled by the wheels.

Should a person fall on the track so close to the advancing car that the descending fender catches some part of his clothing, the fender is liable to ride up over the body. To measurably guard against this difficulty, the serrated strip or plate 17 is provided. The teeth need project only a very little below the edge of the metal portion of the fender. Their function is to sink into the portion of the clothing nipped by the fender and push it along with the car. Any roughened surface will serve if it be such as to prevent the fender from moving or slipping over the part of the clothing upon which it rests.

The cushion-springs 5 provide the necessary elasticity required for the support of the fender. The upper pair of said springs serves to elevate the fender to its normal position after the pressure is removed and to provide it with a normal spring-support, and the lower pair of springs provides the necessary elastic or yielding pressure of the fender on the ground.

I do not limit myself to the exact mechanical construction shown, as this may be varied to some extent without departing materially from my invention. For example, the fender may be depressed by hand as well as by the foot, and the teeth or serrations 16 may be springy or elastic and be in the nature of hooks, if desired. The construction shown is simple and inexpensive and will effect the object sought.

Each end of the car will usually be provided with a fender and operating mechanism like that illustrated.

Having thus described my invention, I claim—

1. The combination with a car, of a fender 1 carried by the car and mounted in an upright position substantially under the end of the car, said fender being adapted for depression, and springs to elevate said fender to its normal position, of means for depressing the fender comprising depressing-arms 9, coupled at their rear ends to the car and at their front ends to the fender, the rock-shaft 10, having bearings in said arms, a cam on said shaft adapted, when rocked to take under some part of the car and depress said arms 9 and the fender, and means substantially as described for rocking said cam from the platform of the car.

2. The combination with a car, a fender carried thereby and adapted to be depressed into contact with the ground, the depressing-arms, and the rocking cam carried by said arms and adapted to take under some part of the car when rocked, of the elbow-lever fulcrumed on the platform and having one arm 13 projecting up through the same and another arm 14, and a link 15 coupling the arm 14 with the rocking cam, whereby the latter may be rocked from the platform, as set forth.

3. The combination with a car, of a vertically-arranged fender at the end of the car, the rigid supporting-arms 2, fixed at their rear ends to the truck-frame of the car and at their respective front ends to vertically-arranged guiding-rods 3, which engage each a pair of keepers, 4, on the fender, the said keepers, the pairs of springs 5, on the rods 3, the pair of springs on each rod being arranged on opposite sides of the arm 2 and abutting on the respective keepers 4, the depressing-arms 9, hinged to the fender at their front ends and having slotted connections with the truck-frame, and mechanism substantially as described for depressing the fender from the platform of the car.

4. The combination with a car, of a fender carried thereby and adapted for depression until its lower edge is in contact with the ground, said fender being provided at its lower edge with a yielding cushion 16, and to the rear of said cushion with serrations adapted to bite into the clothing of a person who may have fallen on the track, as set forth.

In witness whereof I have hereunto signed my name in the presence of two subscribing witnesses.

MORRIS WEISEL.

Witnesses:
PETER A. ROSS,
HENRY CONNETT.